2,693,480

RICINOLEIC ACID CONVERSION PROCESS

Vernon E. Haury, Simi, Calif., assignor of one-half to Simco, Inc., Simi, Calif., a corporation of California No Drawing. Application August 10, 1951,
Serial No. 241,383

6 Claims. (Cl. 260—413)

This invention relates to ricinoleic acid and ricinoleic acid compounds, and more particularly to an improved process for the production of 2-octanone, 2-octanol, omega-hydroxy decanoic acid, sebacic acid, and mixtures thereof, from said acid and acid compounds, whereby the yields of the conversion products, particularly 2-octanone and 2-octanol, are substantially increased over those which have hitherto been obtained.

The principal objects and advantages of the invention comprise: the provision of a ricinoleic acid and acid compound conversion process enabling the obtaining of increased yields of conversion products; the utilization in a ricinoleic acid and acid compound conversion process of a less expensive reactant material than those which have previously been used; and the provision of a ricinoleic acid and acid compound conversion process involving a shorter reaction time than those of the prior known processes of this type.

In summary, my invention consists in the discovery that there is a less expensive material which, when reacted with ricinoleic acid or any hydrolyzable compounds thereof, such as esters, amides, and the like, provides novel and improved results over those obtainable with the conventionally used caustic alkali reactant materials, such as sodium and potassium hydroxide. Specifically, I have discovered the surprising fact that calcium hydroxide, a less active alkaline material than the caustic alkalies, has a quicker and more efficient reaction effect than these more active alkaline materials on members of the ricinoleic acid family, with respect to the obtaining of 2-octanone, 2-octanol, omega-hydroxy decanoic acid, and sebacic acid, and mixtures thereof as ricinoleic acid conversion products. Where prior processes involving the use of alkali metal compounds require a reaction time of many hours, usually in excess of five and as high as seventy-two hours, the subject conversion process may involve a reaction time measured in minutes. Furthermore, yields of 70-75% of the 2-octanone and 2-octanol can be readily obtained when calcium hydroxide is used as the reactant material, whereas the maximum reported yields when the caustic alkalies are used are in the range of 40-50%. Excellent yields of the acid products are also obtained.

In practicing the process of the invention, ricinoleic acid or a ricinoleic acid compound, i. e., a member of the group consisting of ricinoleic acid, its esters and amides is used. Castor oil, containing the readily available ester of ricinoleic acid, is especially practicable as the starting material for the process.

The alkaline reactant, calcium oxide or calcium hydroxide, is first mixed with water, and the mixture is then added to the ricinoleic acid compound, or the reactant may be added to a mixture of the ricinoleic acid compound and water. The amount of water in the reaction mixture may be varied, although it is preferable to use about equal amounts of water and ricinoleic acid compound. A larger proportion of water may be used, especially if it is desired to separate the hot water-soluble calcium salt of omega-hydroxy decanoic acid from the crude reaction product. For more efficient use of reaction space, it will be sufficient for the reaction if as little as seven parts of water are used for one hundred parts of ricinoleic acid compound.

In order to obtain a conversion of the ricinoleic acid or ricinoleic acid compound, an effective amount of alkaline reactant is used. An effective amount of calcium oxide is approximately 10–30 parts by weight thereof to about 100 parts by weight of the acid or acid compound. The equivalent weight of calcium hydroxide is approximately 13–40 parts. Best conversion results are obtained when about one mole of calcium oxide or calcium hydroxide is used per mole of ricinoleic acid, or its ester or amide equivalent. As little as one-half mole of calcium hydroxide per mole of acid is effective, but lower yields of conversion products are produced. More than about one mole of calcium hydroxide per mole of acid does not increase the yields appreciably.

The reaction mixture is heated to effect the conversion reaction. The preferred temperature range for this purpose is from about 275° C. to about 350° C. Temperatures up to about 500° C. may be used, although at temperatures higher than the preferred range excessive pressures are encountered. At 200° C., the conversion reaction takes place at a relatively slow rate.

As to pressure conditions, the reaction may be carried out at normal pressure, or at either a decreased or an increased pressure. Further, the process may be batch or continuous in nature, and may be accompanied by the withdrawal of volatile products during the reaction, or not, as desired.

In the conversion reaction, both 2-octanone and 2-octanol are formed, with the ratio of these products varying with specific reaction conditions. Also, both omega-hydroxy decanoic acid and sebacic acid are formed during the reaction, with the quantity of each being dependent upon the specific reaction conditions.

I have also found that the addition of xylene to the reaction mixture results in improved yields quantitatively.

The following are presented as examples of the conversion process:

(1) 19 parts by weight of calcium oxide were mixed with 130 parts by weight of water, and the mixture was added to 100 parts by weight of castor oil. The resultant mixture was then agitated while being heated as rapidly as possible in an autoclave to a temperature of 300° C. After being subjected for about five minutes to a pressure of about twenty atmospheres at the stated temperature, the autoclave was cooled by immersion in water. The reaction product was treated by steam distillation to obtain about 30 parts by weight of 2-octanone, containing some 2-octanol corresponding to approximately 73% of maximum theoretical yield. Omega-hydroxy acid and some sebacic acid were recovered from the residue.

(2) With a similar mixture and similar condition and procedure, but with 55 parts by weight of xylene added to the reaction mixture, 31.5 parts by weight of 2-octanone product were obtained.

(3) 29 parts of calcium hydroxide, 120 parts of water and 100 parts of castor oil were heated together for five minutes at 325° C. in an autoclave to give 28 parts of 2-octanone and 2-octanol. Basing the calculation on the molecular weights of 2-octanone and ricinoleic acid, the yield corresponds to approximately 68% of maximum theoretical yield.

(4) 22 parts of calcium oxide and 45 parts of water were added to 100 parts of castor oil, and the mixture was heated for five minutes at 300° C. and approximately 14 atmospheres of pressure. Approximately 28 parts of 2-octanone and 2-octanol were recovered.

(5) A mixture of 22 parts of calcium oxide, 190 parts water and 100 parts castor oil was maintained at 250° C. for 90 minutes in an autoclave to yield 18 parts of 2-octanone.

(6) A mixture of 25 parts of calcium oxide, 50 parts of water, and 100 parts of a mineral oil having an initial boiling point somewhat above 300° C. at atmospheric pressure was heated in a reaction vessel at atmospheric pressure to a temperature of about 220° C. Some of the water present was distilled off. The acids recovered from 100 parts of castor oil by hydrolysis were added, together with about 10 parts of water, over a period of about one and a half hours to the reaction vessel which was maintained at a temperature within the range of 220–280° C. Heating was continued for one hour at about 280° C. During the reaction water and about 6 parts of the 2-octanone . . . 2-octanol mixture were distilled off. Omega-hydroxy decanoic acid and sebacic acid were recovered from the product.

(7) A mixture of 100 parts of castor oil, 10 parts of calcium oxide and 130 parts of water was heated in an autoclave to 300° C. for five minutes. Approximately 15 parts of 2-octanone and 2-octanol were recovered from the product by steam distillation.

(8) Ricinoleic acid, prepared by hydrolysis of 100 parts of castor oil, was mixed with a lime slurry, prepared by mixing 22 parts of calcium oxide with 130 parts of water. The calcium salt of ricinoleic acid thus formed was heated with the excess calcium hydroxide and water in a pressure reactor to 300° C. and kept at about 300° C. for five minutes. About 28 parts of 2-octanone and 2-octanol were recovered from the product. Sebacic acid and omega-hydroxy decanoic acid were also separated from the product.

(9) Ricinoleic acid amide, prepared by the reaction of ammonia with 100 parts of castor oil, was heated with 22 parts of calcium oxide and 130 parts of water in a pressure reactor at 300° C. for five minutes. About 22.5 parts of 2-octanone and 2-octanol were produced.

From the foregoing it will be seen that I have provided a ricinoleic acid conversion process which achieves the objects and embodies the advantages above set forth. It is to be understood that all substantial equivalents of the above-described process are within the scope of the invention.

What I claim is:

1. A process for the conversion of a member of the group consisting of ricinoleic acid, its esters and amides into organic compounds within the group consisting of 2-octanone, 2-octanol, omega-hydroxy decanoic acid and sebacic acid comprising heating said group member with water and calcium hydroxide within the range of 225–350° C.

2. A process for converting a member of the group consisting of ricinoleic acid, its esters and amides into organic compounds within the group consisting of 2-octanone, 2-octanol, omega-hydroxy decanoic acid and sebacic acid comprising the steps of forming a mixture of about 100 parts by weight of castor oil, about 7–190 parts by weight of water, and about 13–40 parts by weight of calcium hydroxide, and heating the mixture of a temperature within the range of 250–350° C.

3. A process for converting a member of the group consisting of ricinoleic acid, its esters and amides into organic compounds within the group consisting of 2-octanone, 2-octanol, omega-hydroxy decanoic acid and sebacic acid comprising the steps of forming a mixture of about 100 parts by weight of castor oil, about 7–190 parts by weight of water, and approximately 10–25 parts by weight of calcium oxide, and heating the mixture to a temperature within the range of 250–350° C.

4. A process for converting ricinoleic acid into organic compounds within the group consisting of 2-octanone, 2-octanol, omega-hydroxyl decanoic acid and sebacic acid comprising the steps of forming a mixture of about 100 parts by weight of ricinoleic acid, about 7–190 parts by weight of water, and approximately 10–25 parts by weight of calcium oxide, and heating the mixture to a temperature within the range of 250–350° C.

5. A process for converting a member of the group consisting of ricinoleic acid, its esters and amides into organic compounds within the group consisting of 2-octanone, 2-octanol, omega-hydroxyl decanoic acid and sebacic acid comprising the steps of forming a mixture of about 100 parts by weight of castor oil, about 7–190 parts by weight of water, and approximately 19–22 parts by weight of calcium oxide, and agitating the mixture while heating the same within an autoclave to a temperature within the range of 250–350° C.

6. A process for converting a member of the group consisting of ricinoleic acid, its esters and amides into organic compounds within the group consisting of 2-octanone, 2-octanol, omega-hydroxyl decanoic acid and sebacic acid comprising the steps of forming a mixture of about 100 parts by weight of castor oil, about 7–190 parts by weight of water, approximately 19–22 parts by weight of calcium oxide, and about 55 parts by weight of xylene, and heating the same within an autoclave to a temperature within the range of 250–350° C.

References Cited in the file of this patent

UNITED STATES PATENTS

| Number | Name | Date |
| --- | --- | --- |
| 2,182,056 | Bruson et al. | Dec. 5, 1939 |
| 2,217,515 | Houpt | Oct. 8, 1940 |
| 2,304,602 | Schrauth et al. | Dec. 8, 1942 |